X 000 9292
J. Weems,
Tobacco Press.
Patented Dec. 15, 1835.
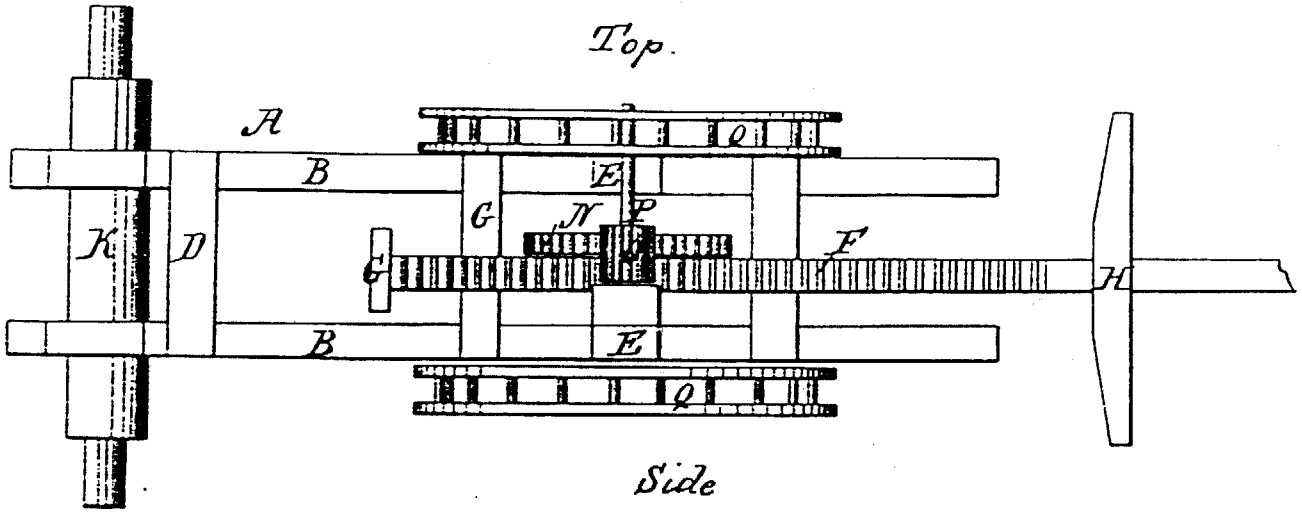
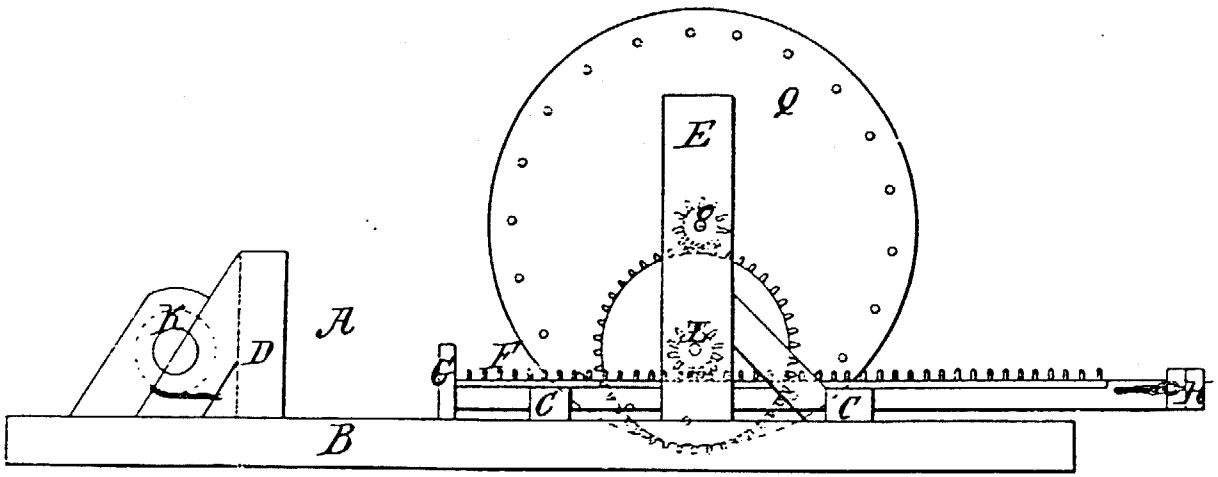
A.M. PHOTO-LITHO CO. N.Y. (OSBORNE'S PROCESS)

John W. Weems

Letters Patent.

The Schedule referred to in these Letters Patent, and making
part of the same, containing a description in the words of the said John
W. Weems himself, of his improvements in the press for pressing Tobacco
and other substances.

Be it known, that I, John W. Weems, of West river Anne Arundel
County, State of Maryland, have made an improvement in the usefull
arts; being a Machine for pressing Tobacco and other substances, called
"Weems' Tobacco Press" which is described as follows, reference being
had to the annexed drawings of the same making part of this speci-
fication. This press consists of a strong frame, A, resting upon the
ground, composed of two sills B, of suitable size and strength, &
placed parallel to each other, and connected together by suitable
cross pieces C. At or near one end of the frame is erected the
head block D. against which the hogshead rests in which the
tobacco is placed, made very strong by proper braces, & framing;
and in the rear of this head block is a windlass K, to assist in the
operation of pressing. Near the centre of the frame are erected two
stout uprights E. mortised, tenoned and braced into the sills to secure &
support the gearing. A cogged driver F, having a round piston G on one end for
pressing the tobacco into the hogshead, works longitudinally between these
uprights. At the other end of the driver, is an arm H, to which are
attached chains leading to the windlass, for assisting in the
operation of pressing. The gearing consists of a small pinion I, fixed
on a shaft, turning in suitable boxes in the uprights; which pinion
works in the cogs of the driver, & propells it horizontally. On this
shaft is a large cog wheel K. into which works another small pinion
O, fixed on a shaft P. turning in boxes in the uprights, & whose
ends project beyond each side of the uprights sufficiently far to to admit one or two driving or tread wheels Q. to be fastened there-
-on for propelling the piston Operation — The driver being run
back, the hogshead into which the tobacco is to be preſsed, is laid
longitudinally upon the frame, with its bottom against the
head block — then a long case, or one or more other hogsheads,
are placed in front of the one into which the whole is to be preſsed
the tobacco to be preſsed, being previously hand packed into these
several hogsheads; — the large tread wheel is then turned, which
turns the small pinion on its shaft; this turns the large cog wheel,
upon whose shaft is fixed the other small pinion; — this works in
the cogs of the driver, and propels it with the piston against the
tobacco, & preſses it into the last hogshead; the driver is then
run back — the filled hogshead removed, & another hogshead
put in its place, and the operation continued as before.

What I claim as my invention, & which I desire to secure
by letters Patent, consists in the before described preſs for preſs-
ing tobacco, and other substances.

Witneſses
G. W. Taylor.
Wm. P. Elliot.

John W. Weeing.

540[illegible]

(Granted December 15. 1835).

Drawing